Patented June 8, 1948

2,443,005

UNITED STATES PATENT OFFICE 2,443,005

FLUORINE-CONTAINING VINYL ESTERS

Ralph A. Jacobson, Landenburg, Pa., assignor to E. I. du Pont de Nemours & Company, Wilmington, Del., a corporation of Delaware No Drawing. Application December 9, 1944, Serial No. 567,519

16 Claims. (Cl. 260—84)

This invention relates to new fluorine-containing vinyl esters and to polymers derived therefrom.

Polymeric vinyl esters of the lower fatty acids, particularly polyvinyl acetate, have assumed great importance in many commercial applications but improvements in the properties are still needed for certain industrial applications. The introduction of fluorine into polymerizable monomers often results in polymeric materials of improved properties compared to their non-fluorine-containing analogs, but the introduction of fluorine has invariably presented serious difficulties.

I have now discovered a new class of polymerizable fluorine-containing vinyl esters and polymeric materials of improved properties obtained therefrom. Accordingly, this invention has as an object the provision of new fluorine-containing vinyl esters and new fluorine-containing polymeric materials. A further object is a simple and practicable process for obtaining said esters. A still further object is the preparation of a vinyl ester of a fluorine-containing carboxylic acid, which acid comprises a saturated four-carbon atom ring having a —COOH radical and at least two fluorine atoms attached directly to said ring. A still further object is the polymerization of said vinyl ester. Another object is the polymerization of said vinyl ester in the absence of another polymerizable compound. Still another object is the preparation of interpolymers of said vinyl ester and another polymerizable compound. Additional objects will become apparent from an examination of the following description and claims.

These and other objects and advantages are accomplished according to the herein described invention which broadly comprises reacting acetylene with a fluorine-containing carboxylic acid which comprises a saturated four-carbon atom ring having a —COOH radical and at least two fluorine atoms attached directly to said ring; and polymerizing the resultant vinyl ester alone or with another polymerizable compound which contains at least one ethylenic linkage.

One preferred embodiment of this invention comprises heating tetrafluorocyclobutanecarboxylic acid with acetylene in the liquid phase in the presence of a mercury salt; and then heating the resultant vinyl ester of tetrafluorocyclobutanecarboxylic acid in the presence of a catalytic amount of benzoyl peroxide.

Another preferred embodiment of this invention comprises heating tetrafluorocyclobutanecarboxylic acid with acetylene in the liquid phase in the presence of a mercury salt; and thereafter heating the resultant vinyl ester of tetrafluorocyclobutanecarboxylic acid with up to an equal weight of a polymerizable compound which contains a terminal ethylenic double bond in the presence of a catalytic amount of benzoyl peroxide.

By the expression "polymerizable compound which contains at least one ethylenic linkage," as used herein and in the appended claims, is meant an organic compound which contains at least one C=C double bond which is not present in a benzene nucleus, i. e., at least one ethylenic double bond, said compound having the property of polymerizing to yield a macromolecular organic compound containing a plurality of recurring units which are joined together in a chain-like manner, i. e., products having a degree of polymerization greater than a trimer.

The following examples, in which proportions are in parts by weight unless otherwise specified, are given for illustrative purposes and are not intended to place any restrictions on the herein described invention.

EXAMPLE I

A mixture of 238 parts of tetrafluorocyclobutanecarboxylic acid, 200 parts of benzene, 10 parts of mercuric sulfate, 10 parts of mercuric oxide, and 2 parts of hydroquinone is treated with acetylene at 50° C. for 15 hours during vigorous stirring. The dark liquid is filtered and distilled at reduced pressure. After removal of the benzene, a fraction amounting to 54 parts of the vinyl ester, boiling at 58–60° C. at 10 mm., is collected. The recovery of pure tetrafluorocyclobutanecarboxylic acid amounts to 156 parts. The formation of the vinyl ester may be expressed as follows.

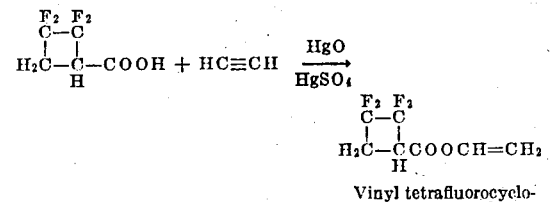

Vinyl tetrafluorocyclobutane carboxylate

Analysis of the vinyl ester of tetrafluorocyclobutanecarboxylic acid gives the following results.

$N_D^{25}$ 1.3780

Fluorine. Found: 38.30%. Required for $C_7H_6O_2F_4$=38.38% F.

Example II

*Polymerization of vinyl ester of tetrafluorocyclobutanecarboxylic acid*

A mixture of 100 parts of the vinyl ester of tetrafluorocyclobutanecarboxylic acid and 1 part of benzoyl peroxide is heated upon the steam bath. In less than 5 minutes, the ester polymerizes to a solid material, soluble in acetone. Films may be prepared from this solution.

At 60° C. the polymerization proceeds much more slowly and a period of 1.5 to 2 hours is required to reach syrupy consistency. The product may be isolated by dissolving the thick syrup in acetone and pouring this into a 1:1 mixture of methanol and water. The resin thus obtained is further washed with water and dried in a vacuum oven at 60° C. The plastic is deformable at room temperature.

Example III

*Interpolymers*

The formation of interpolymers is readily effected by heating the vinyl ester of tetrafluorocyclobutanecarboxylic ester with the desired monomer in the presence of benzoyl peroxide. The following interpolymers can be prepared at 45° C. using 0.2% of benzoyl peroxide based on the mixture of monomers.

terminal methylene group; while my preferred acid, namely that having the formula

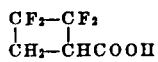

is obtained most readily by heating at a temperature within the range of from 50° C. to 250° C., acrylonitrile with tetrafluoroethylene, which is stable against polymerization on standing under pressure at 25° C., and thereafter hydrolyzing the resultant 1-cyano-2,2,3,3-tetrafluorocyclobutane. Thus these polyfluorocyclobutanemonocarboxylic acids contain not more than four fluorine atoms and have solely hydrogen atoms attached to one of the ring carbon atoms adjacent to the carboxyl-bearing carbon atom of the ring.

As hereinbefore stated, my novel monomeric vinyl esters are obtained by reacting acetylene with a carboxylic acid which comprises a saturated four-carbon atom ring having a —COOH radical and at least two fluorine atoms attached directly to said ring. Said reaction is effected in the liquid phase in the presence of a mercury salt as catalyst. Although a temperature of 50° C. is employed in the process of Example I, this temperature is not critical, and it may be varied in either direction. The reaction rate will depend to some extent upon the temperature. Both the total amount of catalyst and the ratio of

INTERPOLYMERS OF VINYL TETRAFLUOROCYCLOBUTANECARBOXYLATE

| Composition | Per Cent Yield | Softening Temp., ° C. | Impact [1] Strength | Remarks |
|---|---|---|---|---|
| 90 parts of methyl methacrylate, 10 parts of vinyl ester | 100 | 87 | 0.540 | Colorless. |
| 90 parts of vinyl acetate, 10 parts of vinyl ester | 100 | Deformable at room temperature. |  | Do. |
| 60 parts of acrylonitrile, 40 parts of vinyl ester | 100 | Difficultly fusible |  | Opaque; poor flow. |

[1] Foot pounds per inch notch.

While this invention has been illustrated with particular reference to the use of tetrafluorocyclobutanecarboxylic acid, it is to be understood that any fluorine-containing carboxylic acid which comprises a saturated four-carbon atom ring having a —COOH radical and at least two fluorine atoms attached directly to said ring, may be employed in preparation of my novel monomers. Included among examples of said acids are: tetrafluoro-, tetrafluoromonochloro-, trifluorochloro-, difluorodichloro-, difluoromonochloro-, trifluorobromo-, difluoro-, methyltetrafluoro-, ethylmonochlorotrifluoro- and methylmonochlorotrifluorocyclobutane carboxylic acids.

Markedly improved results are obtained when the fluorine-containing acid employed in my process is a monocarboxylic acid containing a saturated four-carbon atom ring having one —COOH radical and four fluorine atoms attached directly to said ring; while optimum results are had when said acid has the formula

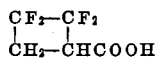

The aforementioned fluorine-containing carboxylic acids and their preparation are described in detail in copending U. S. application Serial No. 501,148, filed September 3, 1943, by Paul L. Barrick and Richard D. Cramer. Said acids may be obtained by heating, at a temperature between 50° C. and that at which decomposition of the reactants and product occurs, a monomeric polyfluoroethylene, which is stable against polymerization on standing under pressure at 25° C., with an unsaturated carboxylic acid containing a mercuric oxide to mercuric sulfate can be varied, and if desired other mercury salts may be employed. Other inert solvents, such as aliphatic or aromatic hydrocarbons can be used to dilute the reaction mixture.

The novel vinyl esters of this invention are monomeric compounds which comprise a saturated four-carbon atom ring having a $$—COOCH=CH_2$$

radical and at least two fluorine atoms attached directly to said ring. While any of said monomeric esters may be converted to homopolymers and interpolymers by means of peroxide catalysts, ultraviolet light, heat, or other agents that are effective as polymerization catalysts, markedly improved polymeric materials are obtained when the monomeric vinyl ester subjected to polymerizing conditions is one containing a saturated four-carbon atom ring having one $$—COOCH=CH_2$$

radical and four fluorine atoms attached directly to said ring. Optimum results are had when said vinyl ester has the formula

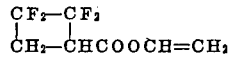

Included among examples of fluorine-containing vinyl esters comprising a saturated four-carbon atom ring having a —COOCH=CH₂ radical and at least two fluorine atoms attached directly to said ring are the vinyl esters of tetrafluoro-, monochlorotetrafluoro-, monochlorotrifluoro-, difluorodichloro-, monochlorodifluoro-, bromotrifluoro-, difluoro-, methyltetrafluoro-, ethylmonochlorotrifluoro-, and methylmonochlorotrifluorocyclobutane carboxylic acids.

Polymerization of the aforementioned fluorine-containing vinyl esters may be effected by the usual methods such as those enumerated below.

*(a) Bulk method*

The monomers may be polymerized in the absence of a solvent or diluent by means of one of the common polymerization catalysts, such as benzoyl peroxide, lauroyl peroxide, diethyl peroxide, or other catalysts which are soluble in the monomer. Ultraviolet light may be used with the catalyst or in lieu thereof. Photopolymerization catalysts such as benzoin or diacetyl may be used in conjunction with ultraviolet light in the presence or absence of peroxide type catalysts as described in U. S. Patent No. 2,367,661. In general the rate of polymerization will be proportional to the temperature, faster rates being obtained as the temperature is increased. Optimum results are had when the temperature is within the range of from 40° C. to 80° C. and the catalyst concentration is within the range of from 0.1% to 2% based upon the weight of the monomer.

*(b) Solution method*

The monomer may be polymerized in a solvent, such as alcohol, benzene, acetone, toluene, dioxane, or ethyl acetate, in the presence of one of the common polymerization catalysts which is soluble in the particular solvent employed. Ultraviolet light may be used in conjunction with a catalyst or in lieu thereof, and if desired, a photo polymerization catalyst such as benzoin or diacetyl may also be employed. The rate of polymerization is proportional to the temperature, faster rates being obtained at the higher temperatures. From 0.1% to 2% of catalyst, based upon the weight of the monomer, is the preferred range in view of the superior products obtained therewith.

*(c) Emulsion method*

The monomer may be polymerized by the emulsion method by any of the modifications fully described in U. S. Patent 2,232,515. Outstanding advantages, however, are obtained by employing an emulsion system comprising ammonium persulfate or an alkali persulfate as the catalyst, an oxidizable oxygen-bearing sulfur compound as a promoter, and the sodium salt of a long-chain hydrocarbon sulfonate or a long-chain alcohol sulfate as the dispersing agent. As promoters may be mentioned sulfur dioxide, sodium bisulfite, sodium sulfite, ammonium bisulfite, sodium hydrosulfite, sodium thiosulfate, soluble salts of thionic acids, p-toluene sulfinic acid and a wide variety of other materials representing modifications of these compounds. The preferred range of catalyst concentration is from 0.1% to 2% based upon the weight of monomer. This range also applies to the oxidizable sulfur compound used as the promoter. The preferred temperature range lies between 25° C. and 60° C.

*(d) Granular method*

The monomer may be polymerized by the granular method according to any of the modifications described in U. S. 2,232,515 and the polymer can thereby be obtained in granular form.

Broadly speaking, this invention contemplates the production of valuable polymers obtained by polymerizing a fluorine-containing vinyl ester comprising a saturated four-carbon atom ring in which a —COOCH=CH$_2$ radical and at least two fluorine atoms are attached directly to said ring, or by polymerizing a mixture of said vinyl esters, either in the absence of another polymerizable compound or admixed with another polymerizable compound which contains at least one ethylenic linkage. More specifically, this invention comprises polymerizing one of said vinyl esters with a polymerizable compound which contains at least one ethylenic linkage. Said polymerizable compound may be said vinyl ester itself, i. e., said vinyl ester may be polymerized in the absence of other polymerizable compound to provide a homopolymer, or, in order to provide an interpolymer, said polymerizable compound may be another of said vinyl esters, or an admixture of other of said vinyl esters, or some other polymerizable compound which contains at least one ethylenic linkage, or an admixture of said compounds. Preferably, on account of the greater ease of polymerization, said polymerizable compound containing at least one ethylenic linkage is a polymerizable compound containing a terminal ethylenic double bond. Included among representative polymerizable compounds containing at least one ethylenic linkage are: alpha-methylene monocarboxylic acids, such as acrylic and methacrylic acids, their monohydric alcohol esters, such as methyl acrylate, methyl methacrylate, butyl methacrylate, acryl and methacrylamides, acrylonitrile and methacrylonitrile, vinyl carboxylates such as vinyl acetate, vinyl isobutyrate, vinyl laurate and vinyl benzoate, vinyl halides, such as the chloride, bromide and fluoride, styrene, methyl vinyl ketone, methyl isopropenyl ketone, butadiene, isoprene, and other diene hydrocarbons, N-vinylimides such as N-vinylphthalimide and N-vinylsuccinimide, polyhalogenated ethylenes, such as unsymmetrical dichloroethylene, difluoroethylene, trifluoroethylene, trifluorochloroethylene and tetrafluoroethylene, and esters of itaconic acid. Representative polyfunctional compounds which may be employed as interpolymer ingredients include the polyhydric alcohol esters of methacrylic and acrylic acids, such as ethylene glycol dimethacrylate, hexamethylene glycol dimethacrylate, dimethallyl carbonate, ethylidene dimethacrylate, and hexamethylene dimethacrylamide.

In conducting the process of polymerizing the hereinbefore defined fluorine-containing vinyl esters, either in the absence of or with another polymerizable compound, any of the methods described above may be employed including bulk, solution, emulsion and granulation processes. In general the catalyst concentration is within the range of from 0.1% to 2% based upon the total weight of monomers used. The most effective temperatures lie within the range of from 40° C. to 60° C. since these give high molecular weight polymers at relatively rapid rates. Greater polymerization speeds are obtainable at higher temperatures but usually with some sacrifice in the molecular weight. It is usually advantageous to displace the air in the systems and in the free space above the mixtures with an inert atmosphere such as nitrogen or carbon dioxide. In the solution process, the ratio of monomers to solvent can be varied in accordance with the principle that higher dilutions result in slower rates and produce lower molecular weights. In the emulsion and granulation methods, the ratios of the dispersed phase (mixture of monomers) to water may be widely varied. Convenient and satisfactory amounts of water are within the range of from 100% to about 300% of the dispersed phase. When the granulation method of polymerization is employed, highly effective stirring is essential. For the bulk and solution methods, stirring is optional. In the emulsion method, the effectiveness of the dispersing agent, especially if small concentrations are employed, may be enhanced by agitation of the mixture.

When two or more polymerizable monomers are interpolymerized, the present invention contemplates the addition of the entire amount of the two or more polymerizable compounds to the aqueous or other medium followed by subsequent polymerization. It is well known that the polymerization rates of the monomers operable in this invention may vary to a considerable extent, and it may therefore be found in some cases that the products may be characterized by non-homogeneity and other inferior physical properties. Under these conditions, the polymerization process may be modified by mixing initially all of the more slowly polymerizing material and a small amount of the more rapidly polymerizing material, and thereafter adding small portions of the more rapidly polymerizing material at about the rate at which this material is used up.

The isolation of the polymers of this invention will depend upon the method of polymerization employed. When the bulk or casting method of polymerization is employed, the finished polymer is obtained directly and no purification or subsequent treatment is usually necessary other than vacuum drying or seasoning. When the solution method of polymerization is used, the polymer may be isolated by evaporation of the solvent or by pouring the solution into an excess of non-solvent for the polymer, whereby the latter is precipitated. The precipitated polymer may then be thoroughly washed and dried. When the granulation method of polymerization is employed, the only purification required is to filter the product by suitable means, thoroughly wash with distilled water, and dry. When the emulsion method of polymerization is employed, the polymers may be isolated as finely divided powders by a variety of methods. For example, the dispersion may be sprayed into a heated and/or evacuated chamber whereby the water is removed as vapor and the polymer falls to the bottom of the chamber. The product may also be isolated by cooling the dispersion below the freezing point of the aqueous medium or by the addition of a large volume of a lower aliphatic alcohol, such as methanol or ethanol. The most satisfactory method consists in adding an appropriate amount of an electrolyte solution to the diluted aqueous dispersion with rapid agitation at a temperature just below the point at which the precipitated particles tend to cohere. Suitable electrolytes include sodium chloride, sodium sulfate, hydrochloric acid, phosphoric acid, calcium chloride, magnesium sulfate, lead nintrate, lead acetate, stannous chloride and aluminum sulfate. After precipitation of the polymer, it is filtered and washed repeatedly with water to remove traces of electrolytes and dispersing agent which may adhere to the particles. Washing with dilute solutions (0.1 to 1%) of caustic soda or ammonium hydroxide assists in the removal of the last traces of dispersing agent, and at the same time may yield polymers of increased stability. In order to facilitate low temperature drying of the polymers, it is beneficial to employ a final wash with a lower aliphatic alcohol, such as ethanol or methanol.

When polymerizing a fluorine-containing vinyl ester comprising a saturated four-carbon atom ring in which a —COOCH=CH$_2$ radical and at least two fluorine atoms are attached directly to said ring, or an admixture of said vinyl esters, with another polymerizable compound or admixture of other polymerizable compounds, the ratio of said vinyl esters to other polymerizable material may be varied within relatively wide limits. However, the mixture of polymerizable compounds subjected to polymerization should contain at least 10% by weight of one of said vinyl esters or of a mixture of said vinyl esters. Polymeric products superior for most purposes are had when said mixture contains at least 30% by weight of one of said vinyl esters or of an admixture of said vinyl esters; while polymeric products having optimum properties result when said mixture contains more than 50% by weight of one of said vinyl esters or of an admixture of said vinyl esters.

As hereinbefore stated, the ratio by weight of vinyl ester, comprising a saturated four-carbon atom ring in which a —COOHCH=CH$_2$ radical and at least two fluorine atoms are attached directly to said ring, to other polymerizable material, in the fluorine-containing vinyl ester polymers of this invention, is at least 1:9. For most purposes, however, said ratio should be at least 3:7, while polymers having optimum properties are those in which said ratio is greater than 5:5.

The fluorine-containing vinyl ester polymers of this invention are well adapted to application as pellicle or film-forming materials. Thus there may be had from said polymers: films which are colorless, strong, tough and flexible; solutions of said polymers which provide films having excellent adhesion on wood, glass and metals; unpigmented solutions of said polymers which are useful as clear lacquers, varnishes, or as adhesives, and pigmented solutions which are suitable for coating compositions, such as paints, pigmented lacquers for wood, metal, paper and the like; unpigmented solutions, emulsions or dispersions of said polymers which are suitable for impregnating or coating paper, textiles, fibers, wood or other porous or semi-porous materials to contribute such properties as strength, toughness, flexibility, and impermeability to water. Furthermore, there may be obtained from said polymers films and sheetings which are useful as transparent wrapping materials. The instant invention also provides polymers which are adapted to molding by heat and pressure; and polymers with flowing characteristics such that they are well adapted for injection molding. Molded articles had therefrom are tough, strong, flexible, and suitable for mechanical working, such as by punching or drilling.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. A fluorine-containing vinyl ester having the formula

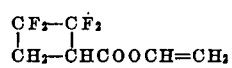

2. The process for obtaining the product defined in claim 1 which comprises heating a compound having the formula $$\begin{array}{c} CF_2-CF_2 \\ | \quad \quad | \\ CH_2-CHCOOH \end{array}$$

with acetylene in the liquid phase in the presence of mercuric sulfate and mercuric oxide.

3. A fluorine-containing vinyl ester homopolymer, said ester having the formula $$\begin{array}{c} CF_2-CF_2 \\ | \quad \quad | \\ CH_2-CHCOOCH=CH_2 \end{array}$$

4. An interpolymer of a fluorine-containing vinyl ester with another polymerizable compound which contains a terminal ethylenic double bond, said vinyl ester having the formula $$\begin{array}{c} CF_2-CF_2 \\ | \quad \quad | \\ CH_2-CHCOOCH=CH_2 \end{array}$$

and said interpolymer containing at least 10% by weight of said fluorine-containing vinyl ester.

5. An interpolymer of methyl methacrylate with the vinyl ester of 2,2,3,3-tetrafluorocyclobutane mono-carboxylic acid, the percentage by weight of said vinyl ester in said interpolymer being at least 10%.

6. The vinyl ester of a polyfluorocyclobutanemonocarboxylic acid containing not more than four fluorine atoms and having solely hydrogen atoms attached to one of the ring carbon atoms adjacent to the carboxyl-bearing carbon atom of said ring.

7. The vinyl ester of a tetrafluorocyclobutanemonocarboxylic acid having solely hydrogen atoms attached to one of the ring carbon atoms adjacent to the carboxyl-bearing carbon atom of said ring.

8. The process for obtaining the vinyl ester of a polyfluorocyclobutanemonocarboxylic acid which comprises heating acetylene in the presence of mercuric sulfate and mercuric oxide with a polyfluorocyclobutanemonocarboxylic acid containing not more than four fluorine atoms and having solely hydrogen atoms attached to one of the ring carbon atoms adjacent to the carboxyl-bearing carbon atom of said ring.

9. The process for obtaining the vinyl ester of a tetrafluorocyclobutanemonocarboxylic acid which comprises heating acetylene in the liquid phase and in the presence of mercuric sulfate and mercuric oxide with a tetrafluorocyclobutanemonocarboxylic acid having solely hydrogen atoms attached to one of the ring carbon atoms adjacent to the carboxyl-bearing carbon atom of said ring.

10. The process for obtaining a fluorine-containing vinyl ester polymer which comprises heating in the presence of a polymerization catalyst, a polymerizable composition comprising the monomeric vinyl ester of a polyfluorocyclobutanemonocarboxylic acid containing not more than four fluorine atoms and having solely hydrogen atoms attached to one of the ring carbon atoms adjacent to the carboxyl-bearing carbon atom of said ring.

11. The process for obtaining a fluorine-containing vinyl ester homopolymer which comprises heating in the presence of a polymerization catalyst the monomeric vinyl ester of a polyfluorocyclobutanemonocarboxylic acid containing not more than four fluorine atoms and having solely hydrogen atoms attached to one of the ring carbon atoms adjacent to the carboxyl-bearing carbon atom of said ring, said vinyl ester being the sole polymerizable compound present.

12. The process for obtaining a fluorine-containing vinyl ester interpolymer which comprises heating in the presence of a polymerization catalyst a monomeric fluorine-containing vinyl ester with another polymerizable compound which contains at least one ethylenic linkage, said vinyl ester comprising at least 10% by weight of said interpolymer and being the vinyl ester of a polyfluorocyclobutanemonocarboxylic acid containing not more than four fluorine atoms and having solely hydrogen atoms attached to one of the ring carbon atoms adjacent to the carboxyl-bearing carbon atom of said ring.

13. A fluorine-containing vinyl ester polymer, said ester comprising the vinyl ester of a polyfluorocyclobutanemonocarboxylic acid containing not more than four fluorine atoms and having solely hydrogen atoms attached to one of the ring carbon atoms adjacent to the carboxyl-bearing carbon atom of said ring.

14. A fluorine-containing vinyl ester homopolymer, said ester comprising the vinyl ester of a polyfluorocyclobutanemonocarboxylic acid containing not more than four fluorine atoms and having solely hydrogen atoms attached to one of the ring carbon atoms adjacent to the carboxyl-bearing carbon atom of said ring.

15. An interpolymer of a fluorine-containing vinyl ester with another polymerizable compound which contains at least one ethylenic linkage, said vinyl ester comprising at least 10% by weight of said interpolymer and being the vinyl ester of a polyfluorocyclobutanemonocarboxylic acid containing not more than four fluorine atoms and having solely hydrogen atoms attached to one of the ring carbon atoms adjacent to the carboxyl-bearing carbon atom of said ring.

16. A fluorine-containing vinyl ester polymer, said vinyl ester having the formula $$\begin{array}{c} CF_2-CF_2 \\ | \quad \quad | \\ CH_2-CHCOOCH=CH_2 \end{array}$$

RALPH A. JACOBSON.

REFERENCES CITED

The following references are of record in the file of this patent:

UNITED STATES PATENTS

| Number | Name | Date |
|---|---|---|
| 1,084,581 | Klatte | Jan. 13, 1914 |
| 1,241,738 | Klatte et al. | Oct. 2, 1917 |